(12) United States Patent
Zou et al.

(10) Patent No.: US 11,226,965 B2
(45) Date of Patent: Jan. 18, 2022

(54) NON-HOMOGENOUS SYNOPSIS FOR EFFICIENT PARTITION PRUNING

(71) Applicant: SAP SE, Walldorf (DE)

(72) Inventors: William Zou, Markham (CA); Reza Sherkat, Waterloo (CA); John Smirnios, Kitchener (CA); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 15/964,631

(22) Filed: Apr. 27, 2018

(65) Prior Publication Data

US 2019/0236192 A1 Aug. 1, 2019

Related U.S. Application Data

(60) Provisional application No. 62/623,437, filed on Jan. 29, 2018.

(51) Int. Cl.
*G06F 16/2455* (2019.01)
*G06F 16/22* (2019.01)

(52) U.S. Cl.
CPC .... *G06F 16/24554* (2019.01); *G06F 16/2282* (2019.01); *G06F 16/24556* (2019.01)

(58) Field of Classification Search
CPC ......... G06F 16/24554; G06F 16/24556; G06F 16/2282
See application file for complete search history.

(56) References Cited

U.S. PATENT DOCUMENTS

| | | | | |
|---|---|---|---|---|
| 2008/0120275 A1* | 5/2008 | Cruanes | ............... | G06F 16/2453 |
| 2009/0192980 A1* | 7/2009 | Beyer | .................. | G06F 16/2462 |
| 2010/0250497 A1* | 9/2010 | Redlich | ............... | F41H 13/0093 |
| | | | | 707/661 |
| 2015/0286681 A1* | 10/2015 | Baer | .................. | G06F 16/24554 |
| | | | | 707/754 |
| 2017/0308572 A1* | 10/2017 | Finlay | ................. | G06F 16/2453 |

OTHER PUBLICATIONS

Extended European Search Report, dated Mar. 13, 2019, for European Patent Appl. No. 18209416.9, 13 pages.

(Continued)

*Primary Examiner* — Alford W Kindred
*Assistant Examiner* — Lin Lin M Htay
(74) *Attorney, Agent, or Firm* — Sterne, Kessler, Goldstein & Fox P.L.L.C.

(57) ABSTRACT

Disclosed herein are system, method, and computer program product embodiments for partition pruning via non-homogenous synopsis information. An embodiment operates by maintaining synopsis information for a data partition in accordance with a first synopsis strategy, monitoring performance of the synopsis information within a partition pruning system, determining that the performance of the synopsis information is insufficient, and updating the synopsis information in accordance with a second synopsis strategy better suited for the attributes of the data partition. In some embodiments, a first data partition of a partitioned data table may employ a first synopsis strategy and a second data partition of the partitioned data table may employ a second synopsis strategy.

18 Claims, 9 Drawing Sheets

(56) References Cited

OTHER PUBLICATIONS

Goyal, N. and Sharma, Y., "New Binning Strategy for Bitmap Indices on High Cardinality Attributes," Compute, Bangalore, Karnataka, India, 5 pages (2009).
Jagadish, H. et al., "Optimal Histograms with Quality Guarantees," Proceedings of the 24th VLDM Conference, pp. 275-286 (1998).
Rotem, D. et al., "Efficient Binning for Bitmap Indices on High-Cardinality Attributes," 2004.
Sidirourgos, L. et al., "Column Imprints: A Secondary Index Structure," Proceedings of the 2013 ACM SIGMOD International Conference on Management of Data, 12 pages (2013).
Ślezak, D. et al., "Brighthouse: An Analytic Data Warehouse for Ad-hoc Queries," Proc. of the VLDB Endowment, vol. 1, No. 2, pp. 1337-1345 (2008).
Sun, L. et al., "Fine-grained Partitioning for Aggressive Data Skipping," 2014 ACM SIGMOD International Conf. on Management of Data, pp. 1115-1126 (2014).
Wang, Y. et al., "A Novel Approach for Approximate Aggregations Over Arrays," Proceedings of the SSDBM, 13 pages (2015).
Wu, K. and Yu, P., "Range-Based Bitmap Indexing for High Cardinality Attributes with Skew," Proc. of the 22nd Annual Int'l Computer Software and Applications Conference, 6 pages (1998).

\* cited by examiner

NON-HOMOGENOUS SYNOPSIS FOR EFFICIENT PARTITION PRUNING

CROSS-REFERENCE TO RELATED APPLICATIONS

This application claims the benefit of U.S. Provisional Patent Application No. 62/623,437 filed on Jan. 29, 2018, which is incorporated by reference herein in its entirety.

BACKGROUND

Generally, in-memory databases rely on secondary data indices to improve the performance of query processing on large data volumes. In some examples, the secondary indices reduce the execution time of a query without requiring significant memory overhead. One performance enhancing approach that makes use of secondary indices is synopsis-based partition pruning. In synopsis-based partition pruning implementations, a system may maintain synopsis information for individual data partitions, and use the synopsis information to determine whether to prune the data partition during execution of a query. Typically, a synopsis-based pruning system applies the same synopsis strategy to each data partition of a data volume. However, individual synopsis strategies provide differing levels of efficiency and performance based upon one or more attributes of a data partition.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for partition pruning using non-homogenous synopsis information.

Figure 1:
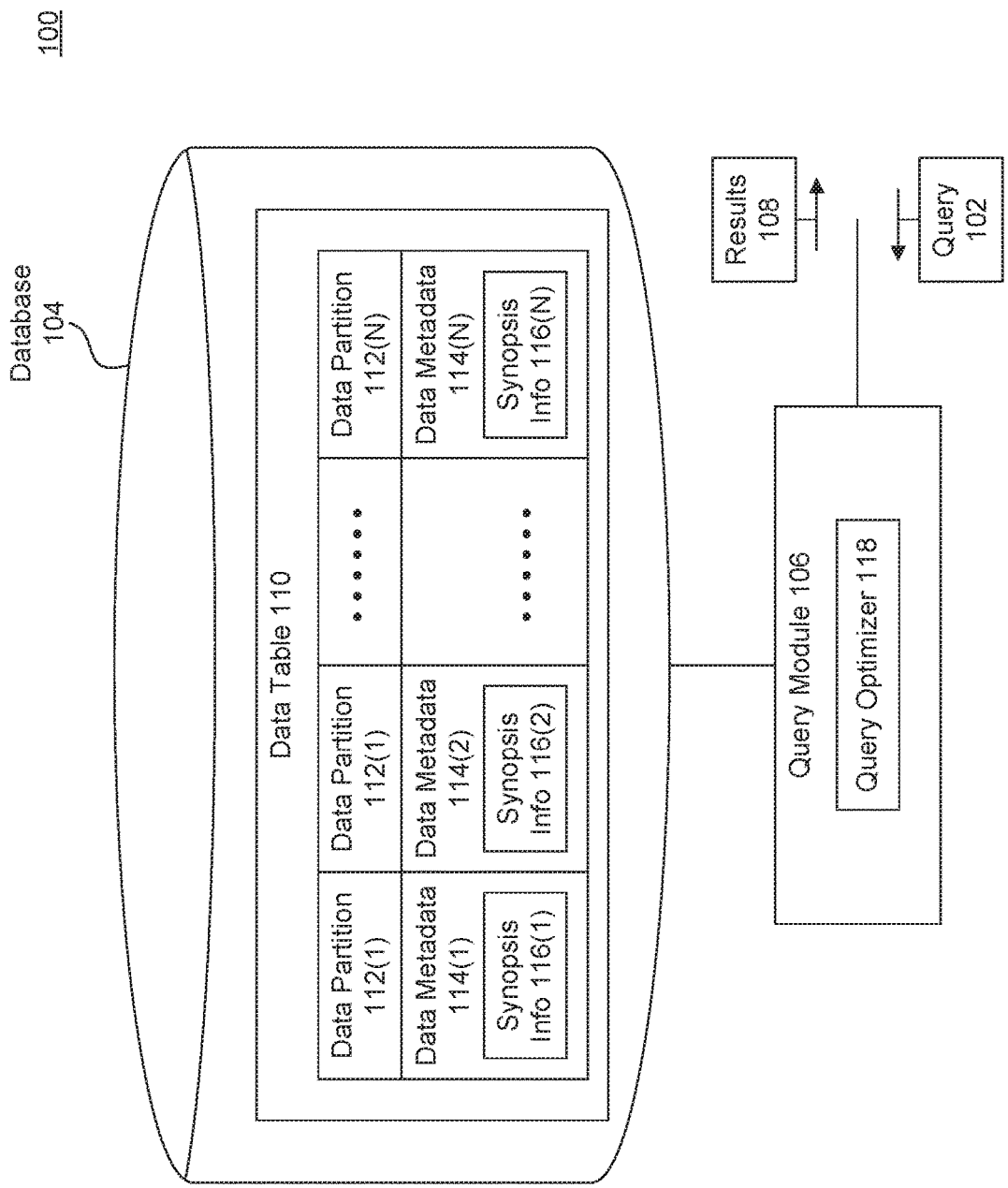
FIG. 1 is a block diagram illustrating examples of query processing system with partition pruning capabilities, according to some embodiments.

FIG. 1 illustrates an example embodiment of a query processing system 100 that processes a query 102 over a data volume (e.g., the database 104). "Query," as used herein, refers to a semantic construction that facilitates gathering and processing information. Further, the query 102 may be expressed in a database query language (e.g., SQL), an object query language, a natural language, and so forth. In some embodiments, a human user or a computer process seeking to retrieve data from the database 104 may provide the query 102 to a query module 106 of the query processing system 100. In response, the query module 106 may execute the query 102, and determine query results 108 including information from the database 104 corresponding to the query 102.

As illustrated in FIG. 1, the database 104 includes a partitioned data table 110. The data table 110 is partitioned into N data partitions 112(1)-(N). Further, each data partition 112 is associated with data partition metadata 114. For instance, data partition 112(1) is associated with data partition metadata 114(1), data partition 112(N) is associated with data partition metadata 114(N), and so forth. The data partition metadata 114 includes detailed information about the contents of the data partitions 112. For example, the data partition metadata 114(1) may describe one or more attributes (e.g., size, data values, data distribution, etc.) of the content of the data partition 112(1).

In some embodiments, the data partition metadata 114 (1)-(N) includes synopsis information 116(1)-(N) for the data partitions 112(1)-(N). Further, the synopsis information 116 may include information identifying the minimum data value and maximum data value of an associated data partition 112. For instance, the synopsis information 116(1) may include the minimum data value and the maximum data value included in the data partition 112(1). In some embodiments, the data values can include at least one of an alphanumeric string, integer, decimal, floating point, date, time, binary, boolean, and/or enumeration.

As illustrated in FIG. 1, the query module 106 includes a query optimizer 118 that may implement one or more performance measures to improve the performance of the query processing system 100 when processing the query 102. In some embodiments, the query optimizer 118 may implement partition pruning with respect to queries processed by the query process system 100. For example, the query optimizer 118 may prune the number of data partitions 112 that are accessed by the query module 106 when executing the query 102. "Partition pruning," as used herein, refers to determining whether a data partition includes data that satisfies a query, and preventing a query module from loading the data partition into memory when the data partition does not include data that satisfies the query.

As an example, the query optimizer 118 may analyze predicates (e.g., conditional statements associated with FROM and WHERE clauses) included in the query 102 to determine which partitions 112(1)-(N) should be retrieved and loaded into memory in order to execute the query 102. Partition pruning dramatically reduces the amount of data retrieved from disk and shortens processing time, thus improving query performance and optimizing resource utilization.

In some embodiments, the query optimizer 118 implements synopsis-based partition pruning in order to avoid the unnecessary loading of data partitions 112 unrelated to the query 102 during the execution of the query 102. As such, the query optimizer 118 may maintain the synopsis information 116(1)-(N). Additionally, the query optimizer 118 may prune the data partitions 112(1)-(N) based at least in part on the synopsis information 116(1)-(N). For example, the query optimizer 118 may determine which data partitions 112(1)-(N) to load into memory during execution of the query 102 based on information describing the data partitions 112(1)-112(N) included in the synopsis information 116.

In one embodiment, the synopsis information 116(1)-(N) may be organized according to different types of synopsis strategies. For example, the synopsis information 116(1) may be organized in accordance with a first synopsis strategy (e.g., an equal length imprint (ELI) partition strategy), and the synopsis information 116(2) may be organized in accordance with second synopsis strategy (e.g., a zone map partition strategy). Some other synopsis strategies that may be utilized by the query optimizer 118 include dynamic bucket expansion and contraction algorithm, optimal binning algorithm, unbiased v-optimized algorithm, column imprints, etc.

Further, the query optimizer 118 may determine which synopsis strategy to apply to a data partition 112 based on one or more attributes (e.g., data distribution) of the content of the data partition 112. For example, the query optimizer 118 may maintain ELI synopsis information 116(1) for the data partition 112(1) based on the data partition metadata 114(1) indicating the presence of skewed data within the data partition 112(1). By applying the synopsis strategy best suited for a data partition 112, embodiments described herein further improve query execution and optimize resource utilization.

Additionally, the query optimizer 118 may determine which synopsis strategy to apply to the data partition 112(1) based upon monitoring the data partition metadata 114(1) associated with the data partition 112(1). For example, the data partition metadata 114(1) may track false negative rates and false positive rates of the synopsis information 116(1). Further, the query optimizer 118 may modify the synopsis strategy applied to the data partition 112(1) based upon the data partition metadata 114(1) indicating that false positive rate or the false negative rate is above a predetermined threshold. Additionally, or alternatively, the query optimizer 118 may modify the synopsis strategy applied to the data partition 112(1) based upon the data partition metadata 114(1) reflecting that an attribute of the data partition 112(1) renders another synopsis strategy better suited for pruning the partition.

For instance, the query optimizer 118 may apply a zone map synopsis strategy to uniformly distributed data or normally distributed data. Further, the query optimizer 118 may apply an ELI synopsis strategy to skewed data. As such, the query optimizer 118 may monitor the content of the data partition 112(2) via the data partition metadata 114(2). If the data partition metadata 114(2) indicates that the data stored in data partition 112(2) is skewed, the query optimizer 118 may modify the synopsis information 116(2) in order to apply an ELI synopsis strategy to the data partition 112(2).

Figure 2:
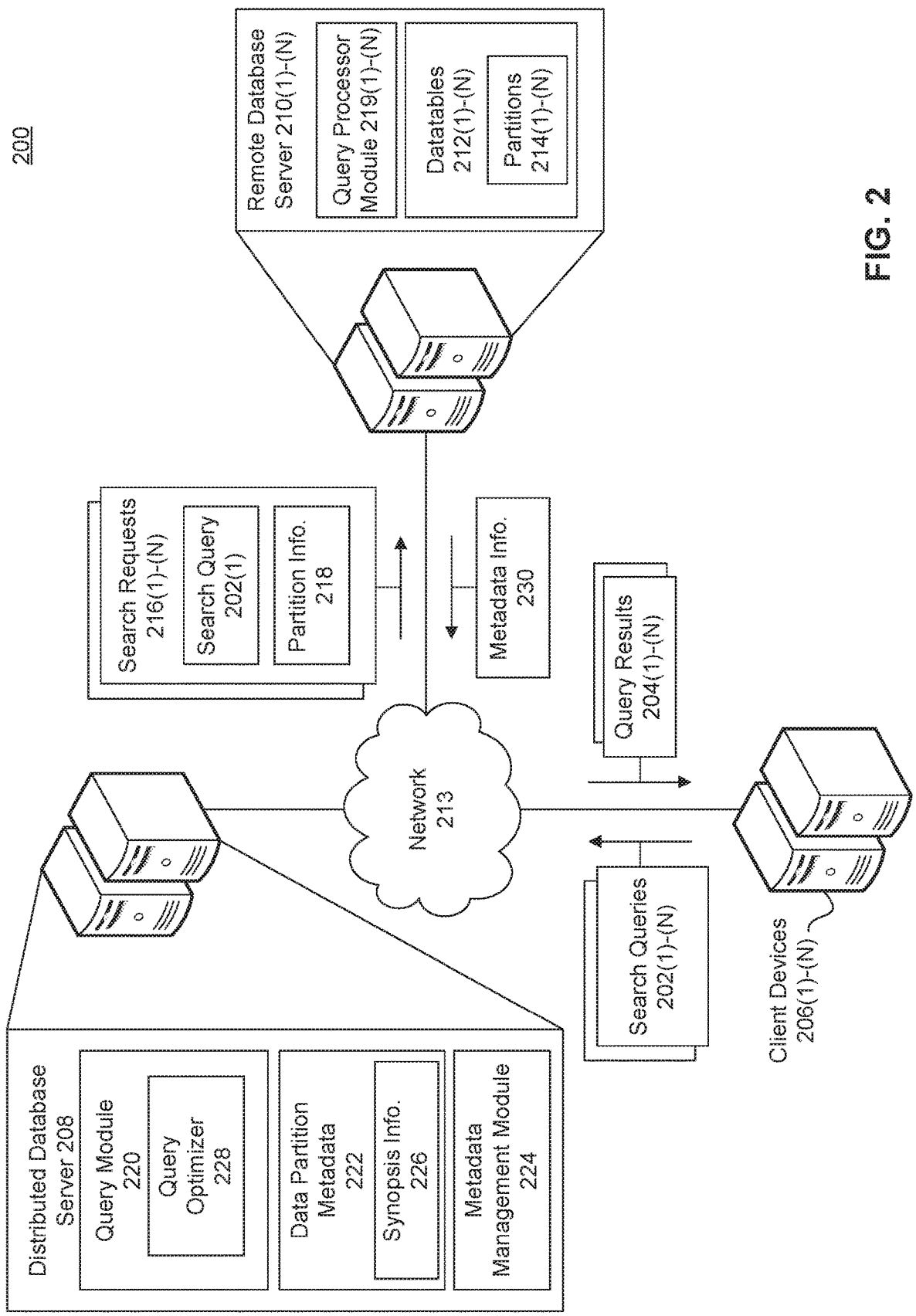
FIG. 2 is a block diagram illustrating examples of a distributed query processing system with partition pruning capabilities, according to some embodiments.

FIG. 2 illustrates an example embodiment of a distributed database system 200 that processes a search query 202 and determines a query result 204. As illustrated in FIG. 2, the distributed database system 200 includes a plurality of client devices 206(1)-(N), a distributed database server 208, and a plurality of remote database servers 210(1)-(N) storing a plurality of partitioned data tables 212(1)-(N). Some examples of the client devices 206 include desktops, laptops, and netbooks; tablet computing devices; smart phones, mobile communication devices, and any other computing device capable of sending communications to the distributed database server 208. Further, in some embodiments, the distributed database server 208 may store one or more the plurality of partitioned data tables 212(1)-212(N).

In some embodiments, the plurality of client devices 206(1)-(N), the distributed database server 208, and the plurality of remote database servers 210(1)-(N) exchange data requests (e.g., search queries 202(1)-(N)) and data responses (e.g., query responses 204(1)-204(N)) via a communication network(s) 213. The communication network(s) 213 may include any or all of a private network, personal area network (PAN), Local-Area Network (LAN), Wide-Area Network (WAN), or the Internet. Further, the connection between any of the plurality of client devices 206(1)-(N), the distributed database server 208, or the plurality of remote database servers 210(1)-(N), and the communication network(s) 213 may be a wireless connection (e.g., Bluetooth, Wi-Fi connection, etc.), or a wired connection (e.g., Ethernet, universal serial bus (USB), etc.).

As illustrated in FIG. 2, the plurality of client devices 206(1)-(N) send search queries 202(1)-(N) to the distributed database server 208 to be processed over the data of the partitioned data tables 212(1)-(N). In some embodiments, the partitioned data tables 212(1)-(N) can include data represented as an alphanumeric string, integer, decimal, floating point, date, time, binary, boolean, and/or enumeration. Further, the queries 202(1)-(N) may be expressed in a database query language (e.g., SQL), an object query language, a natural language, and so forth.

Upon receipt of a search query (e.g., the search query 202(1)) from the client device 206(1), the distributed database server 208 may identify the remote database servers 210(1)-(N) associated with the search query 202(1). In some embodiments, the distributed database server 208 may determine the remote database servers 210(1)-(N) associated with the search query 202(1) based on the data partitions 214(1)-(N) stored on the remote database servers 210(1)-(N). Further, the distributed database server 208 may send search requests 216(1)-(N) including the search query 202(1) to each of the remote database servers 210(1)-(N) associated with the search query 202(1). In some embodiments, the search requests 216(1)-(N) may further include partition information 218(1)-(N) identifying the particular data partitions 214(1)-(N) associated with the search query 202(1).

Upon receipt of the search requests 216(1)-(N), the remote database servers 210(1)-(N) may execute the search query 202(1) over the partitioned data tables 212(1)-(N) using a query processor module 219. For example, the remote database server 210(1) may receive the search request 216(1), and determine which of the data partitions 214(1)-(N) stored on the remote database server 210(1) are identified in the partition information 218(1). Further, the remote database server 210(1) may load the identified data partitions 214(1)-(N) into memory, and the query processor module 219 may execute the search query 202(1) over the identified data partitions 214 to determine the query result 204(1).

Further, the remote database servers 210(1) may send the query result 204(1) corresponding to the search query 202(1) to the client device 206(1). In some embodiments, the remote database servers 210(1)-(N) may send the query results 204(1)-(N) to the distributed database server 208, and the distributed database server 208 may send the query results 204(1)-(N) to the client devices 206(1)-(N). Further, the distributed database server 208 may process the query results 204(1)-(N) before sending the query results 204(1)-(N) to the client device 206(1).

For example, the distributed database server 208 may de-duplicate, rank, and/or order the query results 204(1)-(N). In some other examples, the distributed database server 208 may compress the query results 204(1)-(N). In yet still some other examples, the distributed database server 208 may enforce a data authorization policy with respect to the query results 204(1)-(N). For instance, the distributed database server 208 may remove content from the query results 204(1)-(N) that the client device 206(1) is not authorized to access.

As illustrated in FIG. 2, the distributed database server 208 may include a query module 220, partition metadata 222(1)-(N), and a metadata management module 224. Additionally, the distributed database server 208 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

The query module 220 manages execution of search queries 202(1)-(N) within the distributed database system 200. For example, the query module 220 may receive the search queries 202(1)-(N) from the client devices 206(1)-(N), and manage execution of the search queries 202(1)-(N) over the partitioned data tables 212(1)-(N). Additionally, the query module 220 may send the query results 204(1)-(N) to the client devices 206(1)-(N) in response to execution of the search queries 202(1)-(N).

The data partition metadata 222(1)-(N) corresponds to the data partitions 214(1)-(N) of the partitioned data tables 212(1)-(N). Each data partition 214 is associated with data partition metadata 222. For instance, data partition 214(1) is associated with data partition metadata 222(1), data partition 214(N) is associated with data partition metadata 222(N), and so forth. The data partition metadata 222(1)-(N) includes detailed information about the contents of the data partitions 214(1)-(N). For example, the data partition metadata 222(1) may describe one or more attributes (e.g., size, data values, data distribution, etc.) of the content of the data partition 214(1).

As illustrated in FIG. 2, the data partition metadata 222(1)-(N) may include synopsis information 226(1)-(N) for the data partitions 214(1)-(N). For instance, the data partition metadata 222(1) may include the synopsis information 226(1), the data partition metadata 222(N) may include the synopsis information 226(N), and so forth. The synopsis information 226 may include a synopsis range that identifies the range between the minimum data value and maximum data value of an associated data partition 214. For instance, the synopsis information 226(1) may include the minimum data value and the maximum data value included in the data partition 214(1).

In some embodiments, the synopsis information 226(1)-(N) may be organized according to different types of synopsis strategies. For example, the synopsis information 226(1) may be organized in accordance with a first synopsis strategy (e.g., an equal length imprint (ELI) partition strategy), and the synopsis information 226(2) may be organized in accordance with second synopsis strategy (e.g., a zone map partition strategy). Some other synopsis strategies that may be utilized by the distributed database server 208 include dynamic bucket expansion and contraction algorithm, optimal binning algorithm, unbiased v-optimized algorithm, column imprints, etc.

Further, the query module 220 may determine which synopsis strategy to apply to a data partition 214 based on one or more attributes (e.g., data distribution) of the content of the data partition 214. For example, the data partition metadata 222(1) may include false negative rates and false positive rates of the synopsis information 226(1). Further, the query module 220 may modify the synopsis strategy applied to the data partition 214(1) based upon the data partition metadata 222(1) indicating that the false positive rate or the false negative rate is above a predetermined threshold. Additionally, or alternatively, the query module 220 may modify the synopsis strategy applied to the data partition 214(1) based upon the data partition metadata 222(1) reflecting that an attribute of the data partition 214(1) renders another synopsis strategy better suited for pruning the data partition 214(1).

As illustrated in FIG. 2, the query module 220 may include a query optimizer 228 that determines which remote database servers 210(1)-(N) should receive the search requests 216(1)-(N) corresponding to a search query 202(1). As such, the query optimizer 228 improves the performance of the distributed database system 200 by minimizing the amount of remote database servers 210(1)-(N) required to execute the search queries 202(1)-(N) and/or minimizing the amount of data partitions 214(1)-(N) loaded into memory by the remote database servers 210(1)-(N) to execute the search queries 202(1)-(N). In some embodiments, the query optimizer 228 identifies the remote database servers 210(1)-(N) that should receive the search requests 216(1)-(N) based on the data partition metadata 222(1)-(N).

Figure 5:
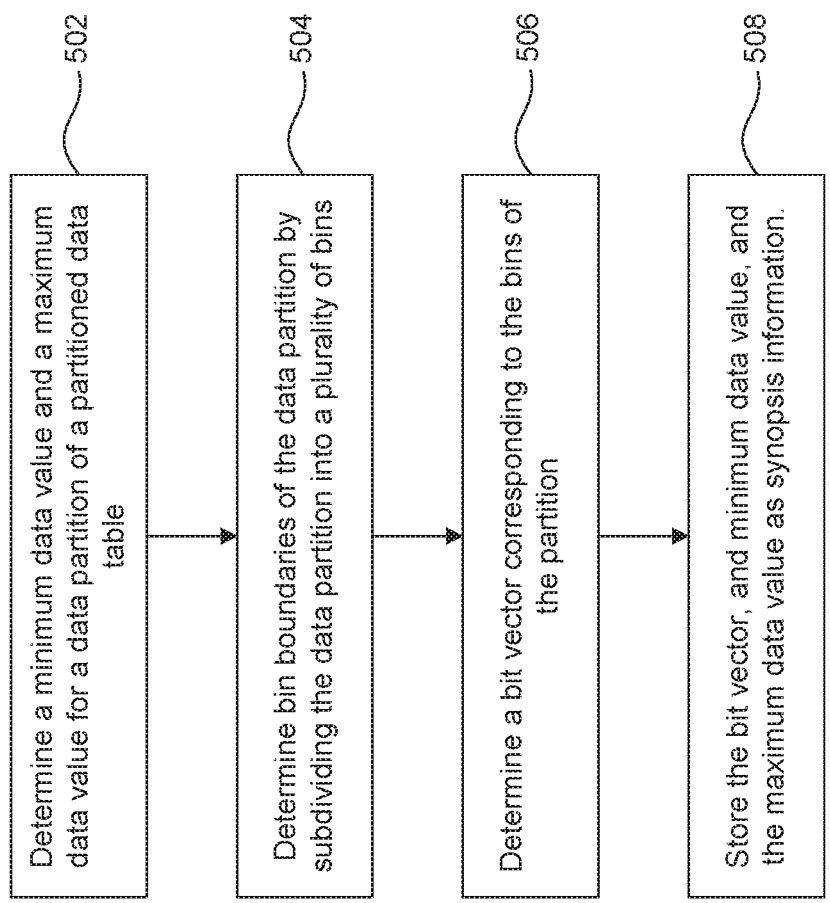
FIG. 5 illustrates a flowchart diagram of a method for determining equal length imprint synopsis information for a data partition, according to embodiments of the present disclosure.
Figure 6:
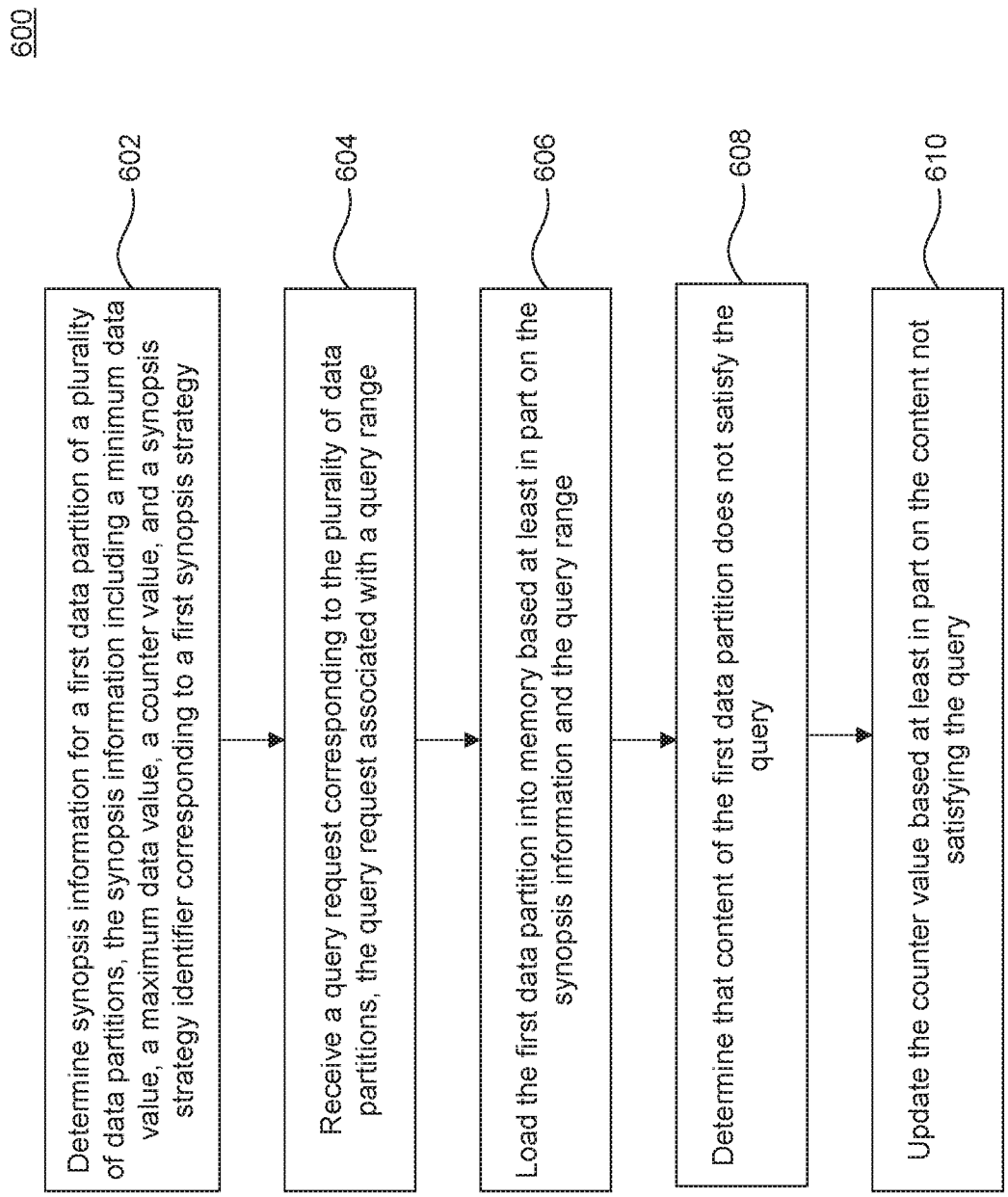
FIG. 6 illustrates a flowchart diagram of a method for non-homogenous synopsis pruning, according to embodiments of the present disclosure.

For example, as described with respect to FIGS. 5-6, the query optimizer 228 may prune the data partitions 214(1)-(N) based at least in part on the synopsis information 226(1)-(N). For example, the query optimizer 228 may determine which data partitions 214(1)-(N) to load into memory during execution of the query 202(1) based on synopsis information 226 describing the data partitions 214(1)-(N) and a predicate included in the search query 202(1). Further, the query optimizer 228 may determine the partition information 218 identifying the data partitions 214 that should be loaded into memory by the remote database servers 210(1)-(N) to execute the search query 202(1). Additionally, the query optimizer 228 may determine which remote database servers 210(1)-(N) should receive the search request 216(1)-(N) based on the data partitions 214(1)-(N) associated with the search query 202(1).

For example, if the query optimizer 228 determines that a remote database server 210(1) stores a data partition 214(1) that should be loaded to execute the search query 202(1), the query module 220 may send the remote database server 210(1) a search request 216(1) identifying the particular data partition 214(1) in the partition information 218. Upon receipt of the search request 216(1), the remote database server 208(1) may load the particular data partition 214(1) into a memory component of the remote database server 210(1), and the query processor module 219(1) may execute the search query 202(1) over the particular data partition 214(1).

Further, the metadata management module 224 may maintain and monitor the data partition metadata 222(1)-(N). For example, the metadata management module 224 may receive metadata information 230 indicating changes to the attributes (e.g., distribution, availability, location, etc.) of the data partitions 214(1)-(N), and performance results of search queries 202(1)-(N) executed by the remote database servers 210(1)-(N). In some embodiments, the metadata management module 224 may track false negative rates and false positive rates of the synopsis information 226.

For example, the metadata management module 224 may receive the metadata information 230 from the remote database servers 210(1)-(N) indicating an occurrence of a false positive resulting in response to reliance on the synopsis information 226(1). As a result, the metadata management module 224 may update the synopsis information 226(1) to reflect the occurrence of the false positive.

Figure 3:
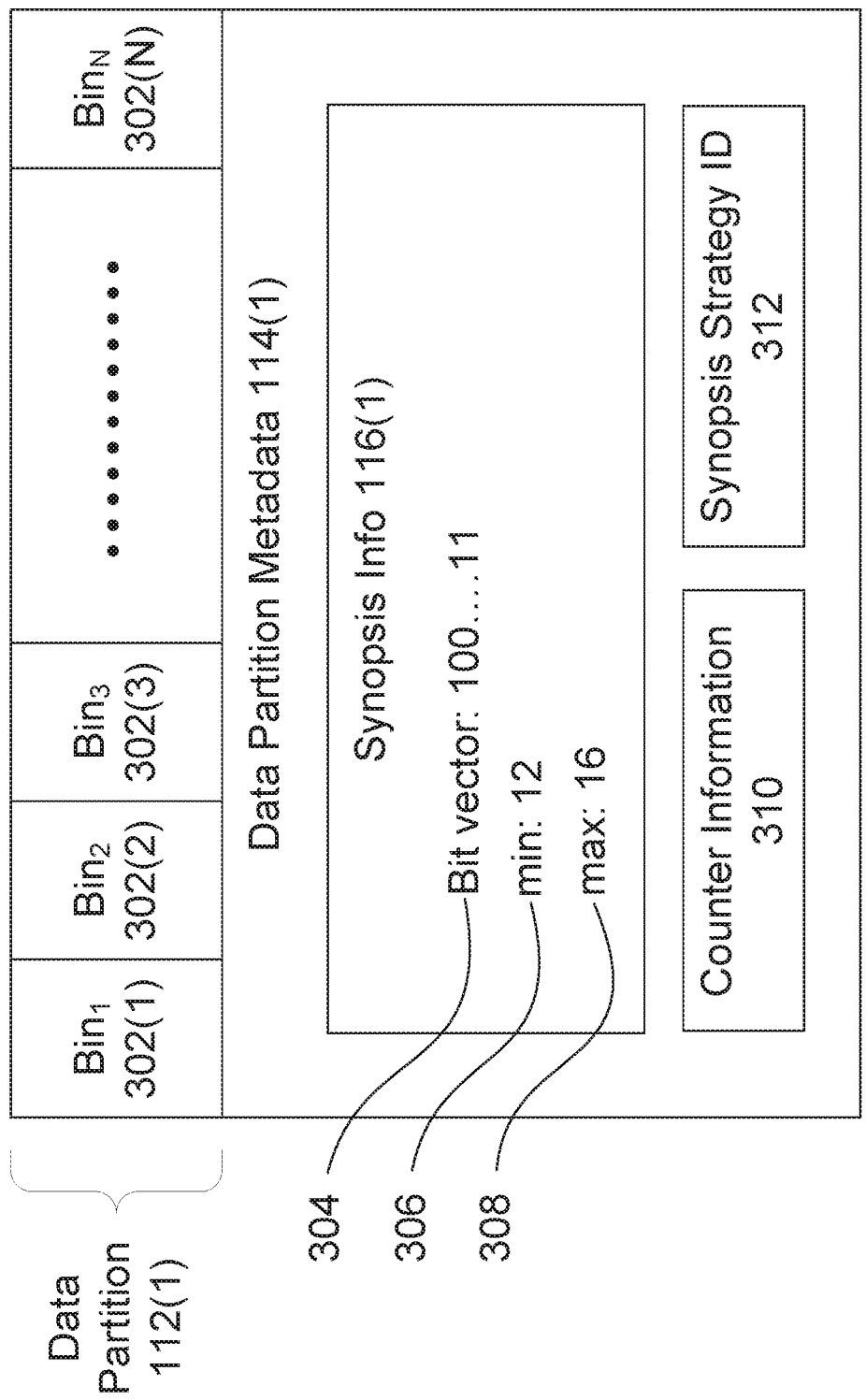
FIG. 3 is an example data partition and corresponding data partition metadata information useful for implementing various embodiments.

FIG. 3 illustrates an example data partition and corresponding data partition metadata information useful for implementing various embodiments. In particular, FIG. 3 illustrates application of an ELI synopsis strategy to the data partition 112(1).

In some embodiments, the database 104 may include a column oriented database that stores the content column wise rather than by row as later described with reference to FIG. 8. Thus, the data partition 112(1) may include a portion of the column data of the data table 110. Further, the data partition metadata 114(1) may include a dictionary of every distinct value that occurs in the portion of the column data, and for each distinct value a list indicating which rows contain the distinct value.

When the data partition 112(1) and the synopsis information 116(1) are maintained in accordance with an ELI synopsis strategy, the data partition 112(1) is divided into a plurality of bins 302(1)-(N). In some embodiments, the bin boundaries are constructed by subdividing the synopsis range (i.e., the range from the minimum data value of the columns associated with the data partition 112(1) to the maximum data value of the columns associated with the data partition 112(1)) into N bins. As such, the first bin 302(1) starts at the minimum data value of the columns associated with the data partition 112(1), and the last bin 302(N) ending with the maximum data value of the columns associated with the data partition 112(1). In some embodiments, the range of values corresponding to the individual bins 302 may be of equal length.

Additionally, the synopsis information 116(1) includes a bit vector 304 equal in size to the number of bins 302 with each bit of the bit vector 304 corresponding to one of the bins 302. For example, the first bit of the bit vector 304 corresponds to the first bin 302(1) of data partition 112(1). Further, the first bit of the bit vector 304 is set to '1' if a record within the data partition 112(1) falls within the range of values of the first bin 302(1). Otherwise, the first bit of the bit vector 304 will be set to '0. The synopsis information 116(1) may further include the minimum data value 306 (e.g., 12) included in the data partition 112(1) and the maximum data value 308 (e.g., 16) included in the data partition 112(1).

As illustrated in FIG. 3, the data partition metadata 114(1) may further include counter information 310 and a synopsis strategy identifier 312. The counter information 310 may be used to determine which synopsis strategy to apply to the data partition 112(1). In some embodiments, the counter information 310 indicates the percentage of queries in which the query optimizer 118 prunes the data partition 112(1) based off the minimum data value 306 and maximum data value 308 without using the bit vector 304. In some embodiments, the percentage may be stored as a float value within the counter information 310. Further, the query optimizer 118 may determine that a different synopsis strategy should be applied to the data partition 112(1) based on the counter information 310. For example, the query optimizer 118 may apply a zone map synopsis strategy to the data partition 112(1) in response to the percentage exceeding a predetermined threshold.

Further, the synopsis strategy identifier 312 indicates the synopsis strategy currently applied to the data partition 112(1). In some embodiments, the synopsis strategy identifier may include a bit value indicating whether the synopsis strategy is a zone map synopsis strategy or an ELI synopsis strategy. In some examples, a '0' bit represents that the currently applied synopsis strategy is zone map, and a '1' bit represents that the current applied synopsis strategy is ELI.

During query evaluation, the query optimizer 118 determines a query range (e.g., 15<age<40) including a set of values relevant to the query 102. In some embodiments, the query range may be based at least in part on a predicate included in the query (e.g., SELECT * FROM Profile WHERE age>15 and age<40). Further, the query range is compared against the synopsis range. "Synopsis range," as used herein, refers to the range of data values from the minimum data value 306 to the maximum data value 308 (i.e., 12<age<16 in the particular example of FIG. 3).

If the query optimizer 118 determines that there is an overlap between the query range and the synopsis range, the query optimizer 118 creates a mask bit vector and an inner mask bit vector. In some embodiments, the query optimizer 118 determines the mask bit vector based on the query range and the bins 302(1)-(N). For instance, each bit of the mask bit vector may correspond to one of the bins 302(1)-(N). Further, a bit of the mask bit vector is set to '1' if there is overlap between the data value range of the bin 302 and the query range. In some embodiments, the query optimizer 118 determines the inner mask bit vector based on the query range and the bins 302(1)-(N). For instance, each bit of the inner mask bit vector may correspond to one of the bins 302(1)-(N). Further, a bit of the mask bit vector is set to '1', if the range of data values corresponding to the particular bin 302 falls within the query range.

Additionally, the query optimizer 118 may perform a bitwise AND operation between the bit vector 304 and the mask bit vector. If the result is 0, the query optimizer 118 prunes the data partition 112(1). Otherwise, the query optimizer 118 determines whether the bit values of the inner mask bit vector match the bit values of the bit vector 304. If the query optimizer 118 determines that the bit vector 304 and the inner mask bit vector match, the query module 106 may load the entire data partition 112(1) into memory. Otherwise, the query module 106 should prune the data partition 112(1).

Figure 4:
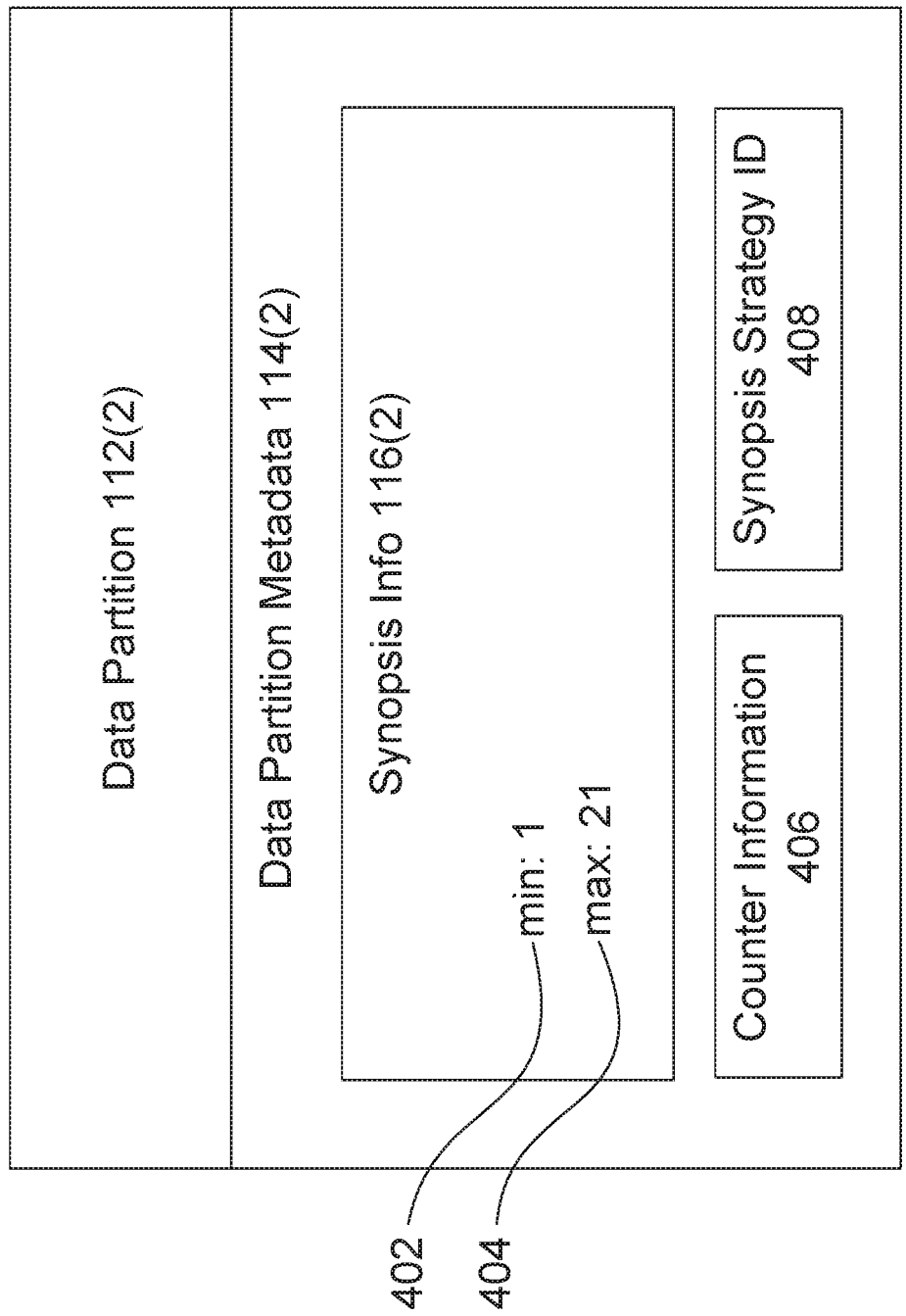
FIG. 4 an example data partition and corresponding data partition metadata information useful for implementing various embodiments.

FIG. 4 illustrates an example data partition and corresponding data partition metadata information useful for implementing various embodiments. In particular, FIG. 4 illustrates application of a zone map synopsis strategy to the data partition 112(2) via the data partition metadata 114(2).

As illustrated in FIG. 4, the data partition metadata 114(2) includes the synopsis information 116(2). Further, the synopsis information 116(2) includes a minimum data value 402 (e.g., 1) included in the data partition 112(2) and the maximum data value 404 (e.g., 21) included in the data partition 112(2).

In some embodiments, the database 104 may include a column oriented database that stores the content column wise rather than by row as later described with reference to FIG. 8. Thus, the data partition 112(2) may include a portion of the column data of the data table 110. Further, the data partition metadata 114(2) may include a dictionary of distinct values that occurs in the column data, and for each distinct value a list indicating which rows contain the distinct value.

When the data partition 112(2) and the synopsis information 116(2) are maintained in accordance with a zone map synopsis strategy, the minimum data value 402 and maximum data value 404 are used in the pruning process. For example, during query evaluation, the query optimizer may determine a query range (e.g., 15<age<40) including a set of values relevant to the query 102. In some embodiments, the query range may be based at least in part on a predicate included in the query (e.g., SELECT * FROM Profile WHERE age>15 and age<40). Further, the query range is compared against the synopsis range (i.e., 1<age<21 in the example of FIG. 4). If the query range overlaps with the synopsis range, the data partition 112(2) must be loaded into memory and examined. Otherwise, the content of the data partition 112(2) does not satisfy the range query, and accessing the data partition 112(2) is unnecessary when processing the query 102.

As illustrated in FIG. 4, the data partition metadata 114(2) may further include counter information 406 and a synopsis strategy identifier 408. The counter information 406 may be used to determine which synopsis strategy to apply to the data partition 112(2). In some embodiments, the counter information 406 indicates the percentage of queries in which the pruning process results in a false positive as the data partition 112(2) is loaded into memory even though the data partition 112(2) does not satisfy the query 102. In some embodiments, the percentage may be stored as a float value within the counter information 406. Further, the query optimizer 118 may determine that a different synopsis strategy should be applied to the data partition 112(2) based on the counter information 406. For example, the query optimizer 118 may determine that an ELI synopsis strategy should be applied to the data partition 112(2) in response to the percentage exceeding a predetermined threshold.

Further, the synopsis strategy identifier 408 indicates the synopsis strategy currently applied to the data partition 112(2). In some embodiments, the synopsis strategy identifier 408 may include a bit value indicating whether the synopsis strategy is a zone map synopsis strategy or an ELI synopsis strategy. In some examples, a '0' bit represents that the currently applied synopsis strategy is zone map, and a '1' bit represents that the current applied synopsis strategy is ELI.

FIG. 5 is a flowchart illustrating example operations for determining ELI synopsis information for a data partition, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, a query optimizer determines a minimum data value and a maximum data value for a data partition of a partitioned data table. For example, the query optimizer 118 may determine the minimum value 306 of the column data stored in the data partition 112(1), and the maximum value 308 of the column data stored in the data partition 112(1).

At 504, the query optimizer determines bin boundaries of the data partition by subdividing the data partition into a plurality of bins. For example, the query optimizer 118 may sub-divide the range of data values spanning from the minimum data value 306 to the maximum data value 308 into the plurality of bins 302(1)-(N). In some embodiments, the bins 302 are of equal length.

At 506, the query optimizer determines a bit vector corresponding to the bins of the data partition. For example, the query optimizer 118 may generate the bit vector 304 of size N wherein each bit of the bit vector 304 corresponds to one of the plurality of bins 302(1)-(N). Further, the query optimizer 118 may iterate through the data partition 112(1), and set a bit of the bit vector 304 to '1' when a record of the data partition 112(1) is within the range of column values corresponding to the bin 302.

At 508, the query optimizer stores the bit vector, the minimum value, and the maximum value as partition synopsis for the data partition. For example, the query optimizer 118 may store the bit vector 304, minimum data value 306, and maximum data value 308 to the synopsis information 116(1). In addition, the query optimizer 118 may store the synopsis strategy identifier 312 corresponding to ELI in the data partition metadata 114(1), and initial counter information 310.

FIG. 6 is a flowchart illustrating example operations for non-homogenous synopsis pruning, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

At 602, a query optimizer determines synopsis information for a first data partition of a plurality of data partitions, the synopsis information including a minimum data value, a maximum data value, a counter value, and a synopsis strategy identifier corresponding to a first synopsis strategy. For example, the query optimizer 118 may determine the minimum value 402 of the column data stored in the data partition 112(2), and the maximum value 404 of the column data stored in the data partition 112(2). Additionally, the query optimizer may store the counter information 406 and the synopsis strategy identifier 408.

At 604, the query optimizer receives a query request corresponding to the plurality of data partitions, the query request associated with a query range. For example, the query module 106 may receive a query 102 from a human user. Additionally, the query module 106 may determine a query range corresponding to the query 102. In some embodiments, the query range corresponds to a predicate of the query 102.

At 606, the query optimizer loads the first data partition into memory based at least in part on the synopsis information and the query range. For example, the query may determine that there is an overlap between the query range and a synopsis range corresponding to the set of data values ranging from the minimum data value 402 to the maximum data value 404. As a result, the query module 106 may load the data partition 112(2) into the memory for query processing.

At 608, the query optimizer determines that content of the first data partition does not satisfy the query. For example, the query optimizer 118 may determine that it was not necessary for the query module 106 to load the data partition 112(2) into memory based on the search results 108.

At 610, the query optimizer updates the counter value based at least in part on the content not satisfying the query. For example, the query optimizer 118 may update the counter information 406 to indicate that a false positive occurred based on the synopsis information 116(2).

Figure 7:
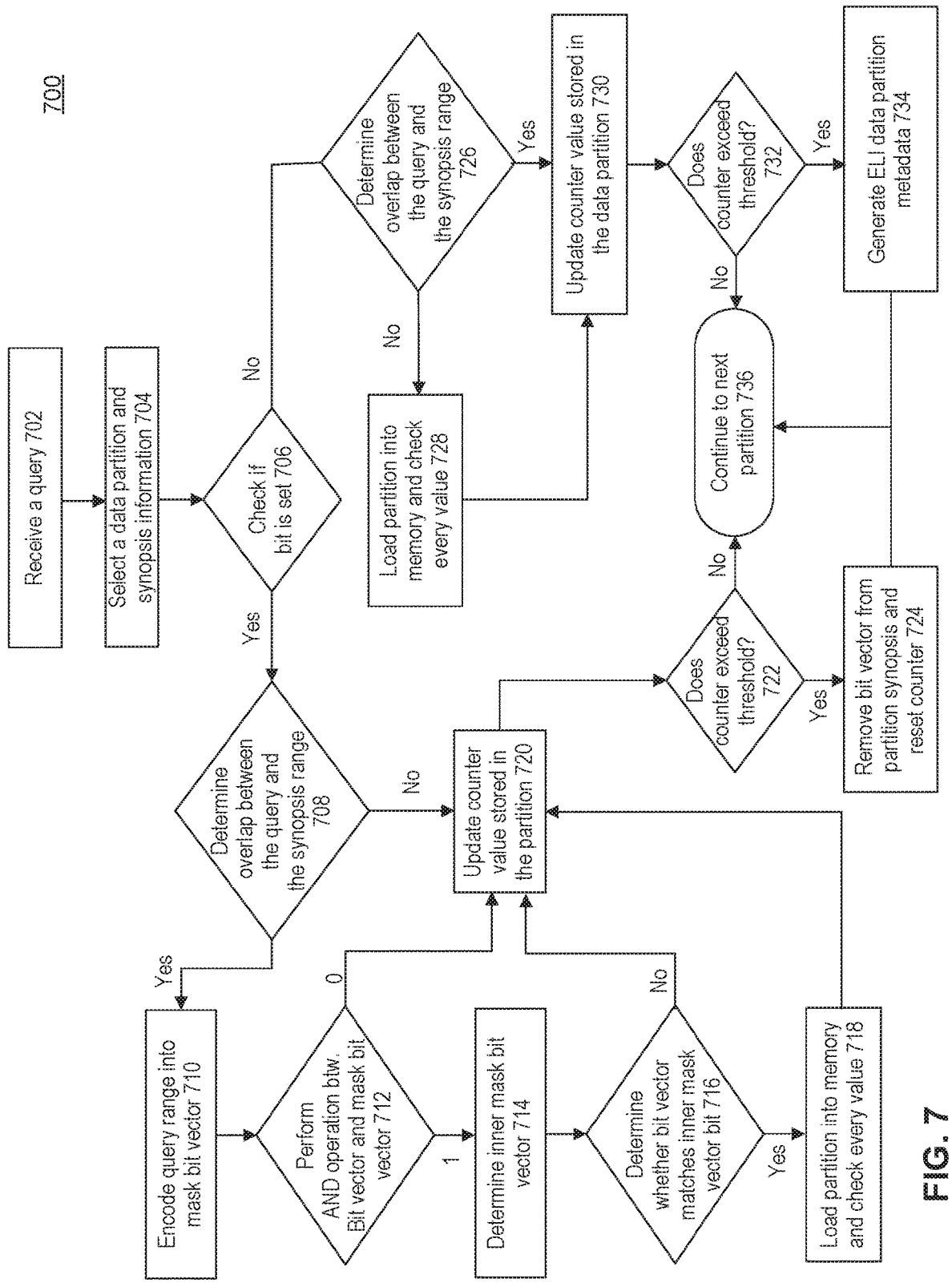
FIG. 7 illustrates a flowchart diagram of a method for non-homogenous synopsis pruning, according to embodiments of the present disclosure.

FIG. 7 is a flowchart illustrating example operations for non-homogenous synopsis pruning, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At 702, the query module receives a query request. For example, the query module may receive the query 102 from a user via a user interface. Further, the query 102 may include a predicate limiting the column data of relevance to the query 102. In some embodiments, the predicate may include a portion of the query antecedent to at least one of a FROM or a WHERE clause.

At 704, the query optimizer selects a data partition and identifies synopsis information for a data partition. For example, the query optimizer 118 may select the first data partition 112(1) and identify the synopsis information 116(1) associated with the first data partition 112(1).

At 706, the query optimizer determines the synopsis strategy associated with the data partition based at least in part on a synopsis strategy identifier of the synopsis information. For example, the query optimizer 118 may identify that the synopsis strategy applicable to the synopsis information 116(1) is ELI based at least in part on the synopsis strategy identifier 312. In some embodiments, the synopsis strategy identifier 312 may include a bit value indicating a particular synopsis strategy. For example, a bit set to '0' may indicate that the applicable synopsis strategy is zone mapping, and a bit set to '1' may indicate that the applicable synopsis strategy is ELI.

At 708, the query optimizer compares the query to the synopsis information. For example, the query optimizer 118 may determine whether a column range corresponding to the predicate of the query overlaps a range spanning from the minimum data value of the synopsis information 116(1) to the maximum data value of the synopsis information 116(1). If the query optimizer determines that there is an overlap, the query optimizer proceeds to step 710. Otherwise, the process proceeds to step 730.

At 710, the query optimizer encodes the query range into a mask bit vector. For example, the query optimizer 118 determines a mask bit vector based on the query range and the bins 302(1)-(N). In some embodiments, each bit of the mask bit vector may correspond to one of the bins 302(1)-(N). Further, a bit of the mask bit vector is set to '1' if there is overlap between the data value range of the bin 302 and the query range.

At 712, the query optimizer performs bitwise operation based on at least the query bit vector and a bit vector of the synopsis information. For example, the query optimizer 118 performs a bitwise AND operation on the mask bit vector and the bit vector 304 of the synopsis information 116(1). If the result of the bitwise operation is equal to zero, the query optimizer 118 prunes the data partition 112(1) and proceeds to step 720. Otherwise, the process proceeds to step 714.

At 714, the query optimizer determines an inner mask bit vector. For example, the query optimizer 118 determines the inner mask bit vector based on the query range and the bins 302(1)-(N). For instance, each bit of the inner mask bit vector may correspond to one of the bins 302(1)-(N). Further, a bit of the mask bit vector is set to '1', if the range of data values corresponding to the particular bin 302 falls within the query range.

At 716, the query optimizer determines whether the inner mask bit vector matches the bit vector. For example, the query optimizer 118 determines whether the bit values of the inner mask bit vector match the bit values of the bit vector 304. If the query optimizer 118 determines that the bit vector 304 and the inner mask bit vector match, the query module 106 may load the entire data partition 112(1) into memory at 718. Otherwise, the process prunes the partition and proceeds to step 720.

At 720, the query optimizer updates the counter information associated with the synopsis information. For example, the counter information 310 may include a numerical value indicating the percentage of queries in which the query optimizer 118 prunes the data partition 112(1) based off the minimum data value 306 and maximum data value 308 without using the bit vector 304. Further, the query optimizer 118 may update the counter information 310 based upon whether the bit vector 304 was used to prune the data partition 112(1)

At 722, the query optimizer determines whether to update the synopsis strategy applied to the data partition based on the counter information. For example, if the numerical value exceeds a predetermined threshold, the query optimizer 118 may determine that a zone map synopsis strategy should be applied to the data partition 112(1) instead of an ELI synopsis strategy.

At 724, the query optimizer removes the bit vector from the synopsis information, resets the counter information, and updates the synopsis strategy identifier to indicate a change to the synopsis strategy. For example, the query optimizer 118 may delete the bit vector 304 of the synopsis information 116(1) and reset the numerical value of the counter information 310(1). Further, the query optimizer 118 may update the synopsis strategy identifier 312 to reflect that the synopsis strategy applied to the data partition 112(1) is a zone mapping implementation and no longer an ELI implementation.

At 726, the query optimizer compares the query to the synopsis information. For example, the query optimizer 118 may determine whether a column range corresponding to the predicate of the query overlaps a range spanning from the minimum data value 402 of the synopsis information 116(2) to the maximum data value 404 of the synopsis information 116(2). If the query optimizer 118 determines that there is an overlap, the query optimizer 118 loads the partition into memory and searches the column data in accordance with the query 102 at step 728. Otherwise, the query optimizer prunes the data partition 112(2) and process proceeds to step 730.

At 730, the query optimizer updates the counter information associated with the synopsis information. For example, the counter information 406 may indicate the percentage of queries in which the pruning process results in a false positive as the data partition 112(2) is loaded into memory even though the data partition 112(2) does not satisfy the query 102. Additionally, the query optimizer 118 may update the numerical value based on whether a false positive occurred.

At 732, the query optimizer determines whether to update the synopsis strategy applied to the data partition based on the counter information. For example, the query optimizer 118 may determine whether the numerical value of the counter information 406 exceeds a predetermined threshold. If the numerical value exceeds a predetermined threshold the query optimizer proceeds to step 734. Otherwise the process proceeds to step 736.

At 734, the query optimizer adds a bit vector to the synopsis information, resets the counter information, and updates the synopsis strategy identifier to indicate a change to the synopsis strategy. For example, the query optimizer 118 may perform a binning process and add a bit vector to the synopsis information 116(2). Further, the query optimizer 118 may update the synopsis strategy identifier 408 to reflect that the synopsis strategy applied to the data partition 112(2) is an ELI synopsis strategy and no longer a zone map synopsis strategy.

At 736, the query optimizer 118 may repeat the method 700 for the next partition of the plurality of data partitions 112.

Figure 9:
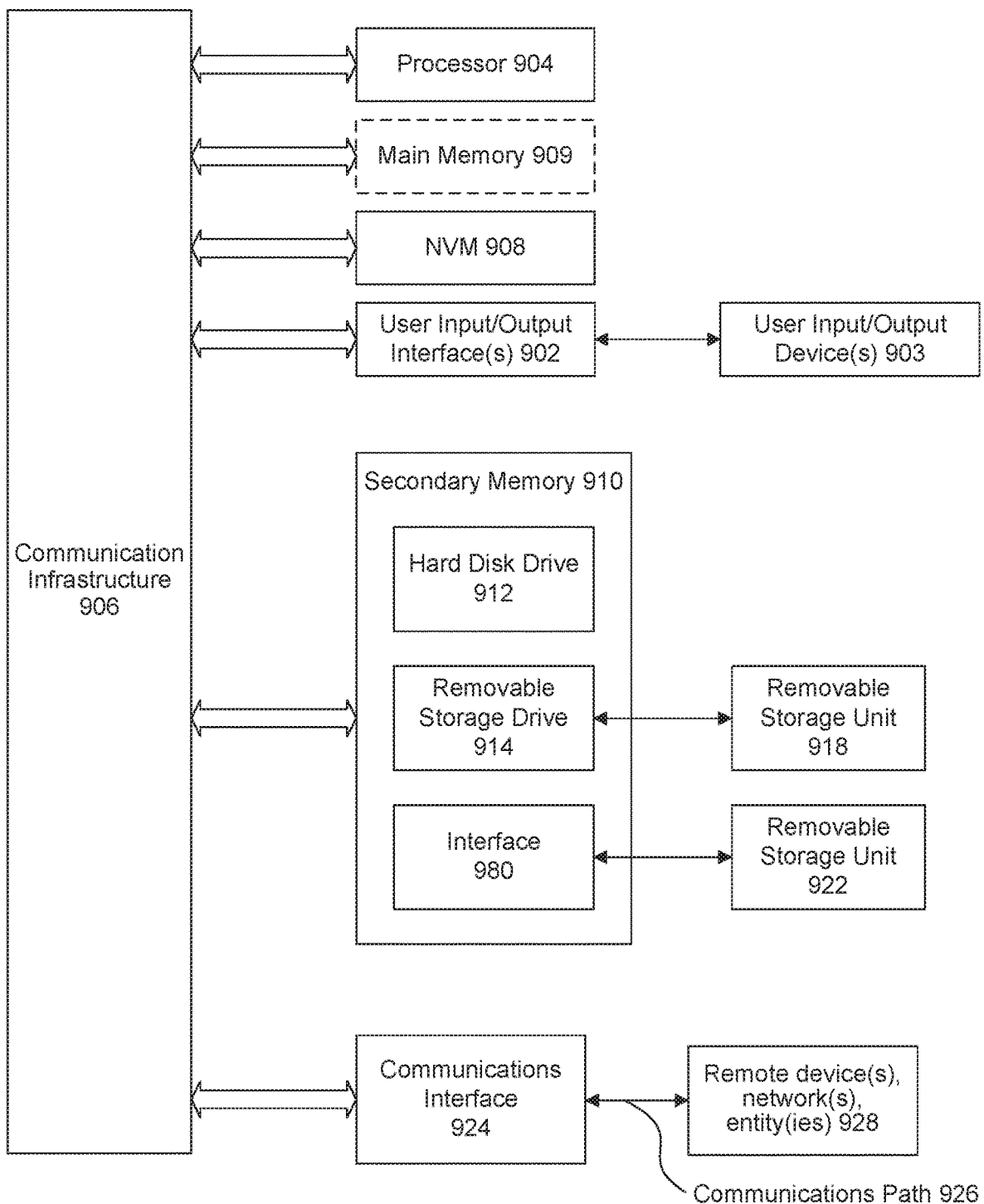
FIG. 9 illustrates a block diagram of a general purpose computer that may be used to perform various aspects of the present disclosure.

Various embodiments can be implemented, for example, using one or more computer systems, such as computer system 900 shown in FIG. 9. Computer system 900 can be used, for example, to implement the systems of FIGS. 1-3, and/or the methods of FIGS. 4-6. Computer system 900 can be any computer capable of performing the functions described herein.

Figure 8:
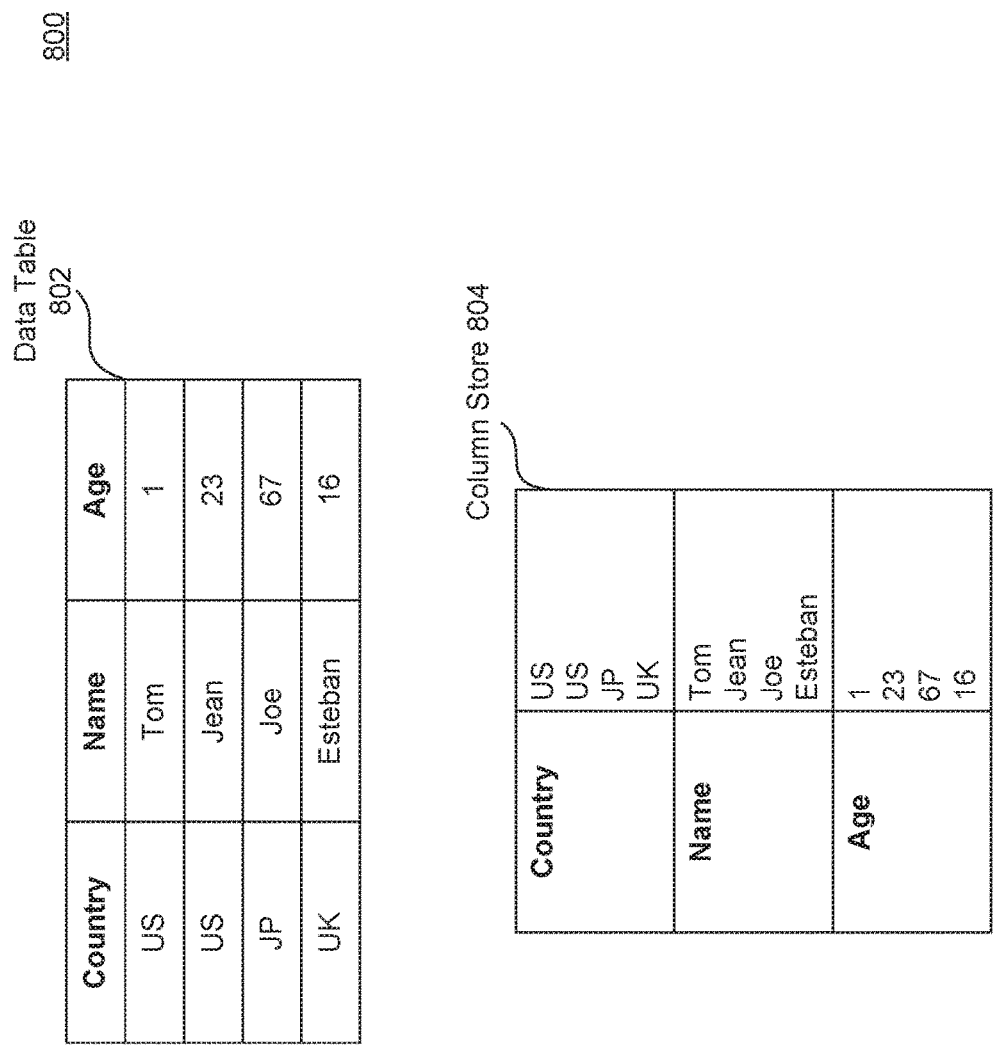
FIG. 8 illustrates a particular embodiment of storing table data in a column store.

FIG. 8 is a particular embodiment of storing table data in a column store useful for implementing various embodiments. As illustrated in FIG. 8, the table data 802 may include one or more rows and columns of data. In addition, the table data 802 can be stored in a column store 804. In the column store 804, the entries of a column are stored in contiguous memory locations.

FIG. 9 is an example computer system 900 useful for implementing various embodiments. Various embodiments can be implemented, for example, using one or more well-known computer systems, such as computer system 900 shown in FIG. 2. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data. In an embodiment, main memory 908 may include both volatile memory 907 and non-volatile memory 909. Non-volatile memory 909 may correspond to persistent memory 110 described herein. Volatile memory 907 may include any memory or storage that resets or does not persist on a power cycle of computer system 900.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 9332 and an interface 290. Examples of the removable storage unit 9332 and the interface 290 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 934. Communication interface 934 enables computer system 900 to communicate and interact with any combination of remote devices, remote networks, remote entities, etc. (individually and collectively referenced by reference number 928). For example, communication interface 934 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 9332, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

Additional views and embodiments are illustrated within Appendix A submitted herewith, which forms a part of this application.

What is claimed is:

1. A method for non-homogeneous synopsis-based pruning, comprising:
    determining synopsis information for a data partition of a plurality of data partitions, the synopsis information including a synopsis range, a counter value, and a synopsis strategy identifier corresponding to a synopsis strategy applied to the data partition, wherein the synopsis strategy identifier comprises a bit value indicating whether the synopsis strategy is a zone map synopsis strategy or an equal length imprint (ELI) synopsis strategy;
    receiving a query request corresponding to the plurality of data partitions, the query request associated with a query range;
    loading the data partition into memory based at least in part on the synopsis information and the query range;
    determining that content of the data partition does not satisfy the query request;
    and updating the counter value based at least in part on the content not satisfying the query request;
    determining that the query range overlaps with the synopsis range;
    determining a first mask bit vector based on the query range and a plurality of bins;
    determining a bitwise result based on performing a bitwise operation based on a synopsis bit vector and the first mask bit vector;
    determining a second mask bit vector based on a second query range and the plurality of bins;
    determining that the synopsis bit vector matches the second mask bit vector;
    wherein the synopsis strategy identifier is a first synopsis strategy identifier, the bit value is a first bit value, and the synopsis strategy is a first synopsis strategy;
    determining that the counter value exceeds a predetermined threshold;
    subdividing the data partition into the plurality of bins based on the synopsis range;
    determining the synopsis bit vector based on the content of the data partition and the plurality of bins;
    storing the synopsis bit vector to the synopsis information;
    replacing the first synopsis strategy identifier with a second synopsis strategy identifier corresponding to a second synopsis strategy applied to the data partition, wherein the second synopsis strategy identifier comprises a second bit value indicating whether the second synopsis strategy is the zone map synopsis strategy or the ELI synopsis strategy; and
    sending a search request to a remote database server, the search request including the search query and partition information identifying the data partition.

2. The method of claim 1, wherein determining the synopsis bit vector based on the content of the data partition and the plurality of bins further comprises: setting a first bit of the synopsis bit vector to 0 or 1 based on whether a portion of the content of the data partition is associated with a first bin of the plurality of bins.

3. The method of claim 1, wherein the first bit value indicates that the first synopsis strategy is the zone map synopsis strategy.

4. The method of claim 1, wherein the second bit value indicates that the second synopsis strategy is the ELI synopsis strategy.

5. The method of claim 1, wherein the query request is a first query request, the query range is a first query range, and further comprising: receiving a second query request associated with the second query range; determining that the second synopsis strategy applies to the data partition based at least in part on the second synopsis strategy identifier; and pruning the data partition based at least in part on the synopsis information and the second query range in accordance with the second synopsis strategy.

6. The method of claim 5, wherein pruning the data partition based on the synopsis information and the second query range in accordance with the second synopsis strategy, further comprises:
    determining that the second query range overlaps with the synopsis range;
    determining a mask bit vector based on the second query range and the plurality of bins;
    performing a bitwise operation based on the synopsis bit vector and the mask bit vector;
    determining a bitwise result from the bitwise operation; and
    pruning the data partition based on the bitwise result.

7. The method of claim 1, wherein the query request is a first query request, the content is a first content, the query range is a first query range, the synopsis range is a first synopsis range, the data partition is a first data partition, the synopsis strategy identifier is a first synopsis strategy identifier, the synopsis strategy is a first synopsis strategy, and further comprising:

subdividing a second data partition into a plurality of bins based on a second synopsis range corresponding to the second data partition;

determining a synopsis bit vector based on second content of the second data partition and the plurality of bins;

receiving a second query request associated with a second query range;

determining that a second synopsis strategy applies to a second data partition of the plurality of data partitions based on a second synopsis strategy identifier corresponding to the second synopsis strategy;

determining that the second query range overlaps with the second synopsis range;

determining a first mask bit vector based on the second query range and the plurality of bins;

determining a bitwise result based on performing a bitwise operation based on the synopsis bit vector and the mask bit vector;

determining a second mask bit vector based on the second query range and the plurality of bins;

determining that the synopsis bit vector matches the second mask bit vector;

loading the second data partition into the memory on the synopsis bit vector matching the second mask bit vector; and performing the second query request over the second data partition.

8. The method of claim 7, wherein determining the first mask bit vector based on the second query range and the plurality of bins further comprises:

setting an individual bit of the first mask bit vector to 1 in response to overlap between the second query range and a bin range corresponding to an individual bin of the plurality of bins.

9. The method of claim 7, wherein determining the second mask bit vector based on the second query range and the plurality of bins further comprises:

setting an individual bit of the second mask bit vector to 1 in response to the second query range falling within a bin range corresponding to an individual bin of the plurality of bins.

10. A non-transitory computer-readable device having instructions stored thereon that, when executed by at least one computing device, causes the at least one computing device to perform operations comprising:

determining synopsis information for a data partition of a plurality of data partitions, the synopsis information including a synopsis range, a counter value, and a synopsis strategy identifier corresponding to a synopsis strategy applied to the data partition, wherein the synopsis strategy identifier comprises a bit value indicating whether the synopsis strategy is a zone map synopsis strategy or an equal length imprint (ELI) synopsis strategy;

receiving a query request corresponding to the plurality of data partitions, the query request associated with a query range;

loading the data partition into memory based at least in part on the synopsis information and the query range;

determining that content of the data partition does not satisfy the query request;

and updating the counter value based at least in part on the content not satisfying the query request;

determining that the query range overlaps with the synopsis range;

determining a first mask bit vector based on the query range and a plurality of bins;

determining a bitwise result based on performing a bitwise operation based on a synopsis bit vector and the first mask bit vector;

determine a second mask bit vector based on a second query range and the plurality of bins;

determine that the synopsis bit vector matches the second mask bit vector;

wherein the synopsis strategy identifier is a first synopsis strategy identifier, the bit value is a first bit value, and the synopsis strategy is a first synopsis strategy;

determining that the counter value exceeds a predetermined threshold;

subdividing the data partition into the plurality of bins based on the synopsis range;

determining the synopsis bit vector based on the content of the data partition and the plurality of bins;

storing the synopsis bit vector to the synopsis information;

replacing the first synopsis strategy identifier with a second synopsis strategy identifier corresponding to a second synopsis strategy applied to the data partition, wherein the second synopsis strategy identifier comprises a second bit value indicating whether the second synopsis strategy is the zone map synopsis strategy or the ELI synopsis strategy; and sending a search request to a remote database server, the search request including the search query and partition information identifying the data partition.

11. The non-transitory computer-readable device of claim 10, wherein the query request is a first query request, the query range is a first query range, the synopsis range is a first synopsis range, the data partition is a first data partition, the synopsis strategy identifier is a first synopsis strategy identifier, the synopsis strategy is a first synopsis strategy, and further comprising:

receiving a second query request associated with a second query range;

determining that a second synopsis strategy applies to a second data partition of the plurality of data partitions based on a second synopsis strategy identifier corresponding to the second synopsis strategy;

determining that the second query range overlaps with a second synopsis range corresponding to the second data partition;

determining a first mask bit vector based on the second query range and the plurality of bins;

determining a bitwise result based on performing a bitwise operation based on the synopsis bit vector and the mask bit vector;

determining a second mask bit vector based on the second query range and the plurality of bins;

determining that the synopsis bit vector matches the second mask bit vector;

loading the second data partition into the memory on the synopsis bit vector matching the second mask bit vector; and performing the second search query over the second data partition.

12. The non-transitory computer-readable device of claim 10, wherein the query request is a first query request, the query range is a first query range, the synopsis strategy identifier is a first synopsis strategy identifier, the synopsis strategy is a first synopsis strategy, the operations further comprising:
  receiving a second query request associated with a second query range;
  determining that a second synopsis strategy applies to the data partition based at least in part on a second synopsis strategy identifier corresponding to the second synopsis strategy; and
  pruning the data partition based at least in part on the synopsis information and the second query range in accordance with the second synopsis strategy.

13. The non-transitory computer-readable device of claim 12, wherein pruning the data partition based on the synopsis information and the second query range in accordance with the second synopsis strategy further comprises:
  determining that the second query range overlaps with the synopsis range;
  determining a mask bit vector based on the second query range and the plurality of bins;
  performing a bitwise operation based on the synopsis bit vector and the mask bit vector;
  determining a bitwise result from the bitwise operation; and
  pruning the data partition based on the bitwise result.

14. The non-transitory computer-readable device of claim 12, wherein the first bit value indicates that the first synopsis strategy is the zone map synopsis strategy.

15. The non-transitory computer-readable device of claim 12, wherein the second bit value indicates that the second synopsis strategy is the ELI synopsis strategy.

16. A distributed database system, comprising:
  a distributed database server, comprising one or more processors coupled to a second memory and configured to:
    determine synopsis information for a data partition of a plurality of data partitions stored on a remote database server, the synopsis information including a synopsis range, a counter value, and a synopsis strategy identifier corresponding to a synopsis strategy applied to the data partition, wherein the synopsis strategy identifier comprises a bit value indicating whether the synopsis strategy is a zone map synopsis strategy or an equal length imprint (ELI) synopsis strategy;
    receive a query request corresponding to the plurality of data partitions, the query request associated with a query range;
    load the data partition into memory based at least in part on the synopsis information and the query range;
    determine that content of the data partition does not satisfy the query request;
    update the counter value based at least in part on the content not satisfying the query request;
    determine that the query range overlaps with the synopsis range;
    determine a first mask bit vector based on the query range and a plurality of bins;
    determine a bitwise result based on performing a bitwise operation based on a synopsis bit vector and the first mask bit vector;
    determine a second mask bit vector based on a second query range and the plurality of bins;
    determine that the synopsis bit vector matches the second mask bit vector;
    wherein the synopsis strategy identifier is a first synopsis strategy identifier, the bit value is a first bit value, and the synopsis strategy is a first synopsis strategy;
    determine that the counter value exceeds a predetermined threshold;
    subdivide the data partition into the plurality of bins based on the synopsis range;
    determine the synopsis bit vector based on the content of the data partition and the plurality of bins;
    store the synopsis bit vector to the synopsis information;
    replace the first synopsis strategy identifier with a second synopsis strategy identifier corresponding to a second synopsis strategy applied to the data partition, wherein the second synopsis strategy identifier comprises a second bit value indicating whether the second synopsis strategy is the zone map synopsis strategy or the ELI synopsis strategy; and
    send a search request to a remote database server, the search request including the search query and partition information identifying the data partition.

17. The system of claim 16, wherein the one or more processors are further configured to:
  receive a search result from the remote database server; and
  send the search result to the client device.

18. The system of claim 16, wherein the one or more processors are further configured to:
  receive, from the remote database server, metadata information indicating performance results corresponding to the search query; and
  update the synopsis information based on the metadata information.

* * * * *